C. H. TRASK & H. F. WHEELER.
Machinery for Lasting Boots and Shoes.

No. 142,657. Patented September 9, 1873.

Witnesses
S. N. Piper
L. W. Köller

Charles H. Trask
Henry F. Wheeler
by their attorney

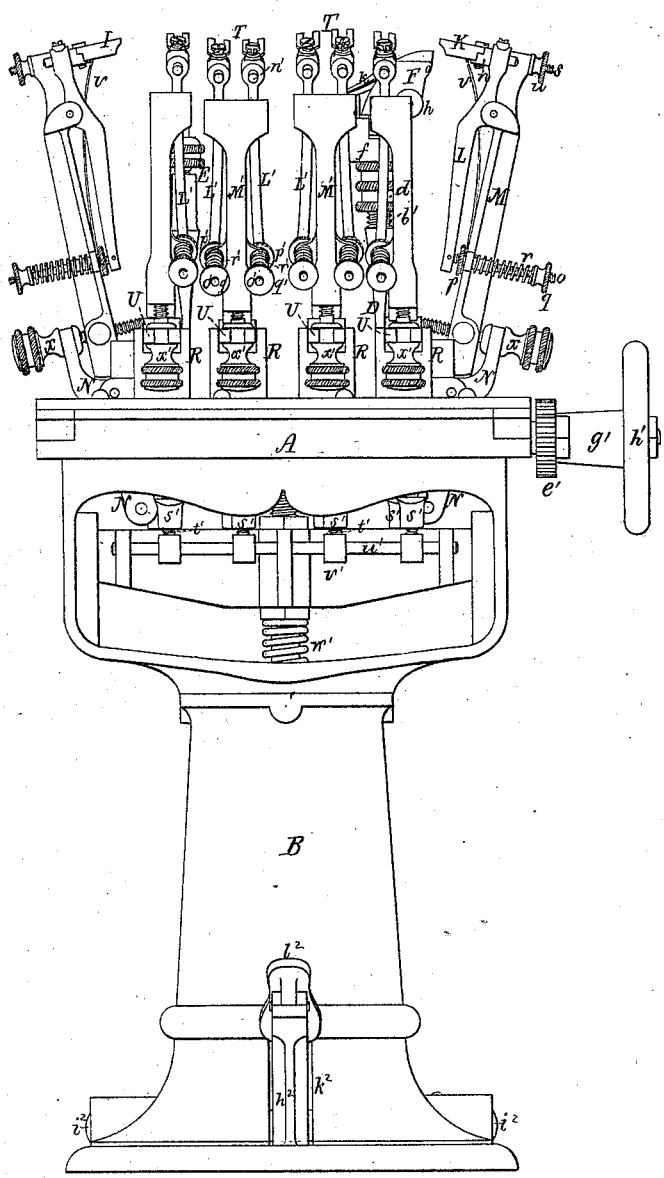

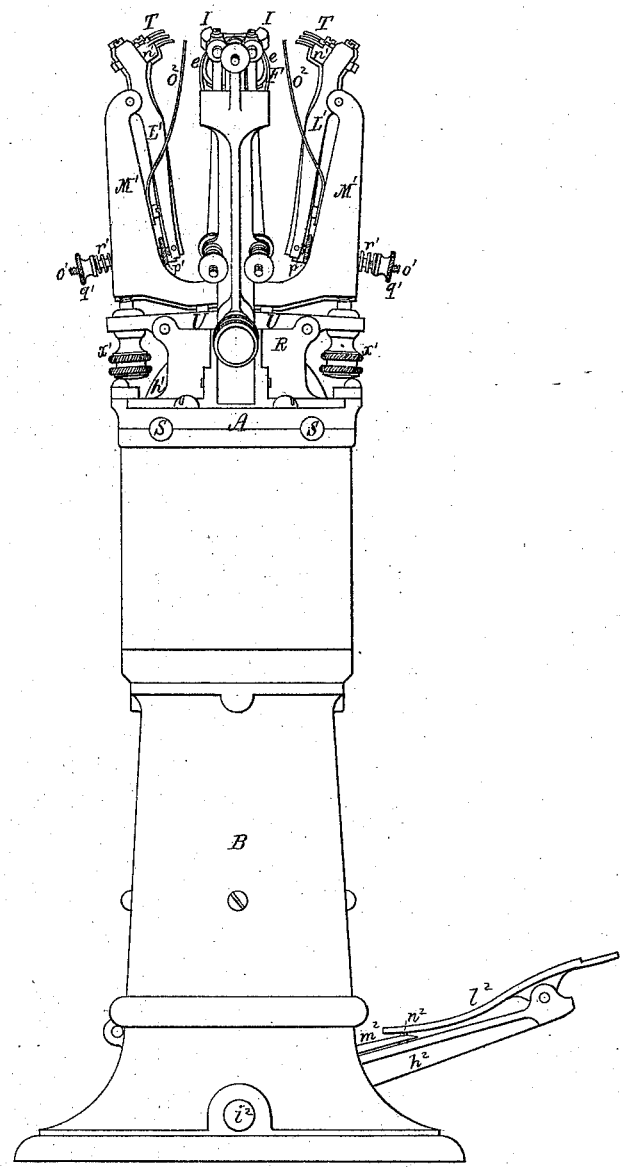

6 Sheets--Sheet 4

C. H. TRASK & H. F. WHEELER.
Machinery for Lasting Boots and Shoes.

No. 142,657.            Patented September 9, 1873.

Witnesses.
S. N. Piper
L. N. Miller

Charles H. Trask.
Henry F. Wheeler.
by their attorney
N. H. Cely

AM. PHOTO-LITHOGRAPHIC CO. N.Y. (OSBORNE'S PROCESS.)

6 Sheets--Sheet 6.
C. H. TRASK & H. F. WHEELER.
Machinery for Lasting Boots and Shoes.
No. 142,657. Patented September 9, 1873.
Fig. 6.
Fig. 7.    Fig. 8.    Fig. 9.    Fig. 10.
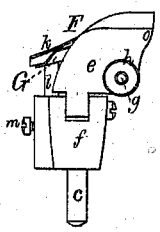 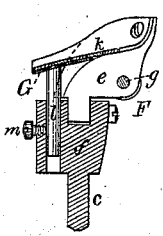 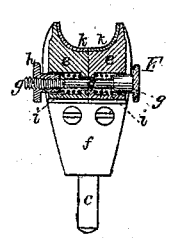
Fig. 13.
Fig. 11.        Fig. 12.
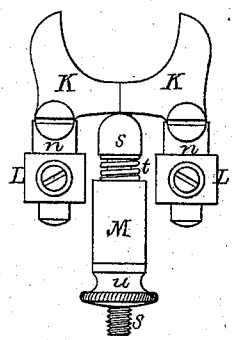 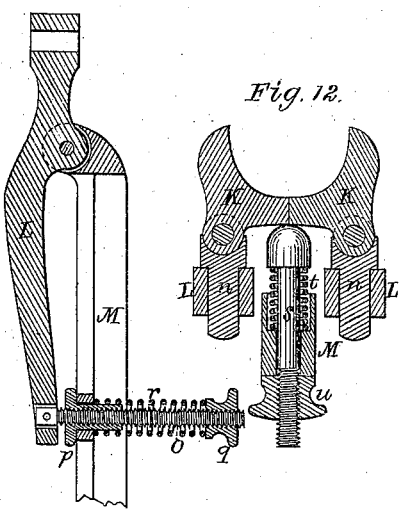
Witnesses.
S. N. Piper.
L. N. Möller.
Charles H. Trask
Henry F. Wheeler
by their attorney.
R. H. Eddy

UNITED STATES PATENT OFFICE.

CHARLES H. TRASK, OF LYNN, AND HENRY F. WHEELER, OF BOSTON, MASS.

IMPROVEMENT IN MACHINERY FOR LASTING BOOTS AND SHOES.

Specification forming part of Letters Patent No. 142,657, dated September 9, 1873; application filed June 23, 1873.

*To all whom it may concern:*

Be it known we, CHARLES H. TRASK, of LYNN, of the county of Essex, and HENRY F. WHEELER, of Boston, of the county of Suffolk, and State of Massachusetts, have invented a new and useful Improvement in Machinery for Lasting the Uppers of Boots or Shoes; and do hereby declare the same to be fully described in the following specification and represented in the accompanying drawings, of which—

Figure 1:
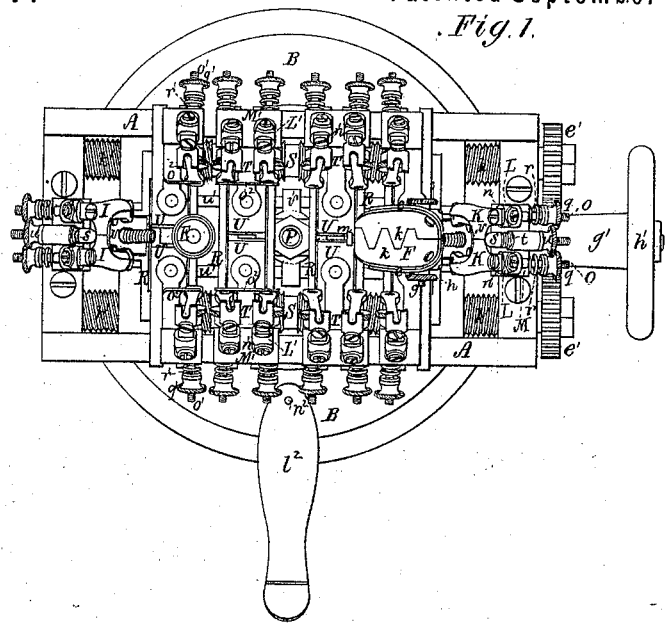
Figure 4:
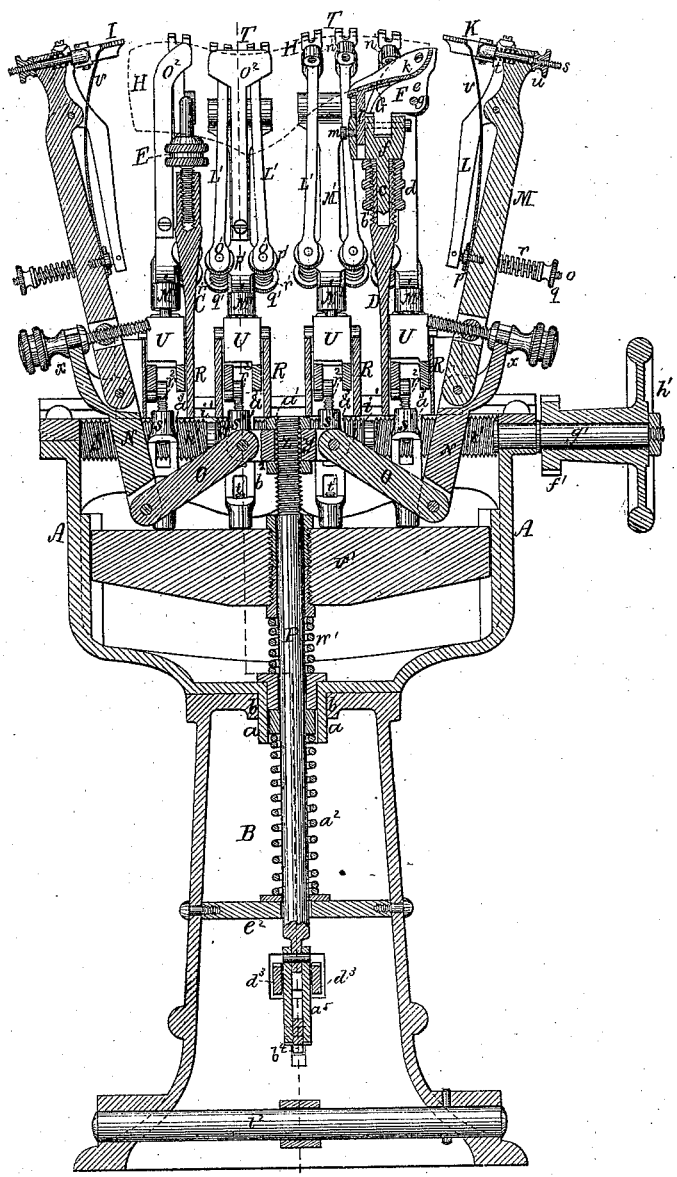
Figure 5:
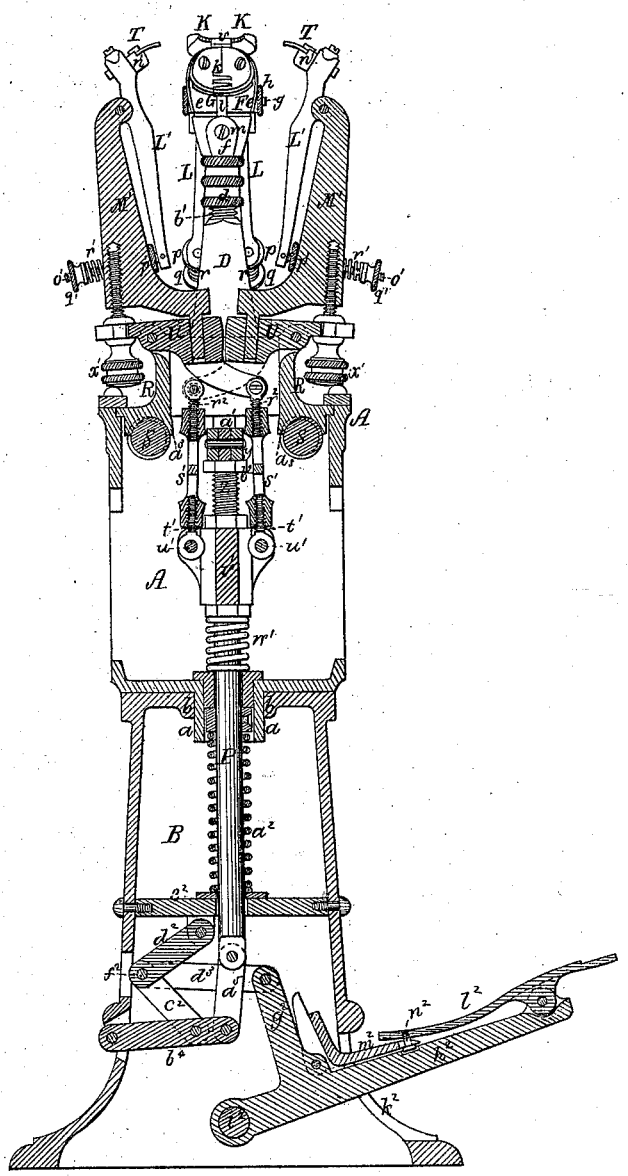

Figure 1 is a top view, Fig. 2 a front elevation, Fig. 3 an end elevation, Fig. 4 a longitudinal section, and Fig. 5 a transverse section, of a machine embodying our invention.

Such other figures as are necessary to a proper illustration of the invention are hereinafter referred to and described.

The invention consists in improvements having reference to the lasting-machine for which one of us, viz., CHARLES H. TRASK, procured Letters Patent No. 107,981, of the United States, dated October 4, 1870; such improvements, with the purpose and mode of operation of each being hereinafter explained and defined.

In the said drawings, A denotes the frame for supporting the main operative parts, it being mounted upon a hollow column, B, and applied thereto, so as to be capable of being revolved horizontally thereupon, the said frame having a pivot, $a$, to extend down into a bearing, $b$, in the top of the column B. From the two outer of a set of carriages, R R R R, arranged upon the said frame A in manner as shown, two standards, C D, are projected upward, as represented. The heel-supporter E of a last screws into the upper end of the standard C. The other standard has a screw, $b'$, projecting upward from it, upon which is screwed a nut, $d$, upon which the toe-supporter F of the last rests, such toe-supporter having a pivot, $c$, to extend down from the carrier $f$ of it into the upper end of the standard D. The pivot enables the supporter F to readily turn horizontally to adapt itself to a last, as occasion may require, the nut and screw being to adjust the altitude of the supporter without necessity of revolving the latter.

Fig. 6 is a top view, Fig. 7 a side elevation, Fig. 8 a front view, Fig. 9 a longitudinal section, and Fig. 10 a transverse section, of the last-supporter F.

It is mainly composed of two concave jaws, $e$ $e$, and a carrier, $f$, the said jaws being so hinged to the carrier as to be capable of spreading or moving apart from one another. Within these jaws are a screw, $g$, a nut, $h$, and helical springs $i$ $i$, arranged as shown in Fig. 10, the springs serving to close the jaws or press them toward one another. The upper or socket part of each jaw is provided with a serrated elastic cap, $k$, whose teeth project across the opening between the jaws and between the teeth of the other cap in manner as shown in Fig. 6. These intertoothed caps serve to break or cover the joint between the two jaws, in order to prevent the upper of a shoe or boot being pressed into the joint. The two caps $k$, usually made of leather or vulcanized india rubber, are fastened at their outer ends or toes to the jaws, and rest upon the top of an auxiliary supporter, G, arranged as shown, and having its shank $l$ inserted vertically into the carrier $f$ and held in place by a clamp-screw, $m$, all being formed and arranged as represented. The auxiliary supporter, capable of vertical adjustment, is for the purpose of sustaining a last at the foot of its instep, while the toe portion of the last may rest on the toe parts of the caps $k$. The toe-supporter F, having yielding jaws $e$ $e$, intertoothed caps $k$ $k$, and the auxiliary or adjustable instep foot-supporter, all arranged, constructed, and applied together as described and shown, can readily adapt itself or be adapted to fit and support a last, however it may vary in width at its toe part.

Besides the heel and toe supports of the last, the machine is provided with a system of heel and toe jaws and one of lateral or side jaws, which, when forced against a shoe upper when on the last, arranged on the supporters E F in manner as represented at H in dotted lines, operate to stretch or "last" it upon the last. The heel-jaws, as well as the toe-jaws, are in pairs, formed as shown at I I and K K.

Fig. 11 is a top view, and Fig. 12 a horizontal section on an enlarged scale, of the pair of toe-jaws K K.

Figure 14:
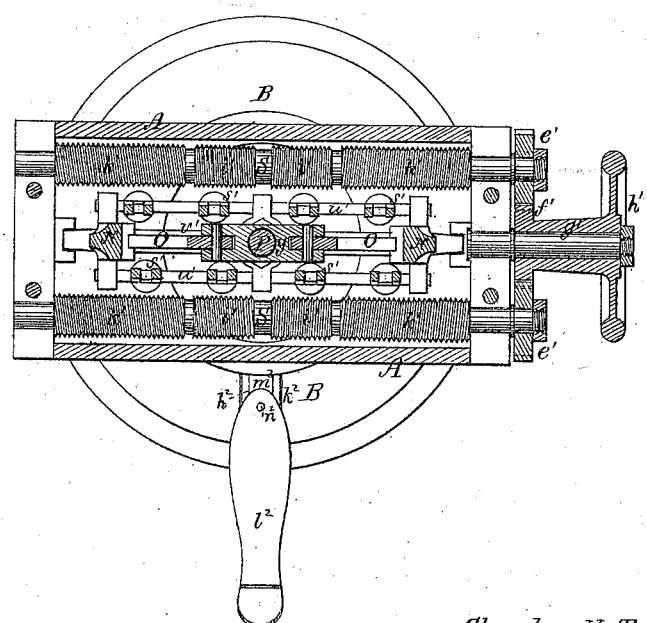

Each of such jaws K K is hinged to one of two slides, $n$ $n$, constructed so as to be capable of sliding and revolving in the upper arm of a lever, L, made, arranged with, and pivoted to an arm, M, as shown. A screw, $o$, pivoted to the lower arm of the lever L, extends through the arm M, and is furnished with two nuts, $p$ $q$, and a helical spring, $r$, which are arranged relatively to each other and the lever and arm in manner as shown in Figs. 2 and 3, and more particularly in Fig. 13, which is a vertical section taken through the screw, the lever, and the arm. The spring allows the jaw K to yield back when forced against the upper, the screw and nuts serving to adjust the lever L and vary the pressure of the spring, as occasion may require. The pair of jaws K K rest against the head of a screw, $s$, arranged with respect to them, as shown. This screw goes through the upper part of the arm M and a helical spring, $t$, arranged in the arm, as shown, there being upon the screw a nut, $u$. While the nut operates as an adjustable shoulder to regulate the forward movement of the screw, the spring is to aid in forcing the jaws asunder, as occasion may require. The joint or opening between the heels of the jaws is spanned or covered by a guard-spring, $v$, fixed to the arm M, and arranged as shown. This guard-spring prevents the leather of the upper from being caught and pinched between the heels of the jaws. At its foot the arm M is hinged to or slipped upon a rocker-lever, N, formed and arranged as shown, such lever N being pivoted to the outer of a series of carriages, R R R R, arranged upon the frame A, as shown. A screw, $x$, applied to the upper arm of the lever N and to the arm M, in manner as exhibited, serves to adjust the arm with reference to the lever, as a shorter or longer last may require. The heel-jaws I I are made like the jaws K K, and are combined with another lever, N, by appliances like those described as appertaining to the said jaws K K and their lever N, all such appliances of the jaws I I being represented in the drawings. Links or toggles O O connect the lower arms of the levers N N with the cross-head $y$ of a rod, P. On the upper part of the rod P is a screw, $z$, provided with two nuts, $a^1$ $b^2$, one of which, $a^1$, is above, and the other, $b^2$, directly underneath the said cross-head, which rests on the latter nut. The two nuts $a^1$ $b^2$ serve to connect the cross-head to the rod, and to adjust the altitude of such head on the rod. On the rod being drawn downward the toggles will be made to operate the levers N N in a manner to cause the heel and toe jaws to be moved toward the last. The several carriages R are to be applied to the frame A, so as to be capable of being moved on it longitudinally. Extending lengthwise of the frame, and underneath the series of carriages, are two screw-shafts, S S, carrying gears $e^1$ $e^1$, which engage with a pinion, $f^1$, arranged between them, and fixed upon a shaft, $g^1$, provided with a hand-wheel, $h^1$, the whole being arranged with and applied to the frame A, as shown in Fig. 14, which is a horizontal section taken through such frame and screw-shafts. Upon each shaft S is a series of screws, $i^1$ $i^1$ $k^1$ $k^1$, to engage with and move the carriages R, the two outer screws, $k^1$ $k^1$, having a pitch to their threads that will cause the two outer carriages to move twice as fast as the two inner ones. From each carriage a stud, $a^3$, or screw-thread or threads should extend down into the operating-screw. By turning the hand-wheel the two screw-shafts will be simultaneously revolved, and as a consequence motion will be communicated to the several carriages, so as to cause them either to approach toward or recede from each other, such being in order to aid in adjusting the heel and toe and lateral jaws to a last, of whatever size it may be. At the same time the heel and toe supporters will be moved away from or toward each other. The lateral jaws are shown at T T, &c., each of such jaws being applied to one of a series of rocker-levers, U, means or mechanism substantially like that by which each heel or toe jaw is connected with its rocker-lever N. The several levers U are pivoted to the carriages R, and arranged therewith, as shown. The mechanism by which each jaw T is connected with its rocker-lever U consists of a slide, $n^1$, a lever, L', an arm, M', and an adjusting-screw, $x'$, screw $o^1$ with its nut $p'$ $q'$, and spring $r^1$, all arranged as shown. The screw $x'$ serves to regulate the altitude of the lateral jaw, the arm M' being applied to the lever U, in manner as shown, so as to be capable of being moved upward or downward relatively thereto. There is pivoted to the inner arm of each lever U a screw, $r^2$, which screws into a swivel, $s'$, that in turn screws upon a screw, $t'$, arranged to slide freely on a horizontal rail or rod, $u'$. There are two of such rods $u'$, they being disposed on opposite sides of and supported by a cross-bar, $v'$, placed upon the rod P, and applied to the frame A, so as to be capable of sliding vertically within it. The said rod P is not connected to the cross-bar $v'$, but is to slide freely through it, the bar being supported by a helical spring, $w'$, arranged as shown. This spring serves to press the bar upward, in order to effect the simultaneous movement of the several lateral jaws away from the last.

We would observe that the swivel $s^1$ and screws $r^2$ and $t^1$, applied together to the rod $u^1$ and lever U, as explained, are for the purpose of aiding in adjusting their lateral jaw to a last. The swivel can be easily revolved on the screws, and, from its position, is readily accessible for the application of the hand or a tool to it for turning it.

While the rod P is being drawn downward it will carry the cross-head $y$ with it, and operate the links or toggles O O, whereby the heel and toe jaws will be moved toward the last. In descending, the said cross-head $y$ will be brought against and will draw down the cross-bar $v^1$ so as to cause the lateral jaws to move up to the last.

The mechanism for effecting depression of the rod P may be now described, a spring, $a^2$, arranged as shown, being employed to effect its elevation. At its foot the rod P is connected by a link, $a^5$, to the inner end of a lever, $b^4$, whose outer end is pivoted to the column B. Toggles $c^2$ $d^2$ connect the lever $b^4$ with a partition, $e^2$, going across the column, as shown, the toggles being jointed together, and to the lever and partition. From the junction-pin $f^2$ of the toggles links $d^3$ extend, and are pivoted to the upper part of an arm, $g^2$, extending upward from a pedal-lever, $h^2$, arranged as shown, and to turn upon a shaft, $i^2$, going across the base of the column B. The lever $h^2$ goes through an opening, $k^2$, in the side of the column, and is provided with a foot-rest, $l^2$, which is pivoted to the lever. The toe of the foot-rest extends over and upon a lever-latch, $m^2$, pivoted to the pedal-lever, and formed and arranged as represented. The latch at its outer end is notched to receive a headed stud, $n^2$, projecting downward from the toe of the foot-rest, as shown.

By a workman placing his foot upon the foot-rest and pressing downward upon it the pedal-lever will be forced down, whereby the toggles will be caused to approach the rod P and cause it to be drawn downward. After such rod may have been sufficiently depressed to bring the several jaws up to the last, or against the leather thereon, so as to effect the lasting of it, the workman should with his foot force down the toe-rest, so as to actuate the lever-latch, and cause it to catch upon the top of the slot, and hold the pedal down and the jaws closed upon the leather on the last. By pressing upon the heel or rear part of the foot-rest the front part of such rest may be raised, so as to move the latch out of engagement with the top of the slot $k^2$.

In order to aid in lasting an upper with the machine, we employ with each lateral jaw or pairs a spring presser, $o^2$, formed and arranged with the jaw-arm M', in manner as shown, such presser at its foot being fixed to the arm. These pressers come in contact with the leather before the jaws act upon it, and force it up to the last, so that the jaws can turn it over the sole to good advantage.

We herein make no claim to such portions of the machine as are covered by the claims of the patent hereinbefore mentioned; but, in the above-described shoe or boot lasting machine,

We claim as of our invention as follows, viz:

1. The combination and arrangement of the pivot $c$, the screw-nut $d$, and screw $b^1$ with the standard D and the last-toe supporter F.

2. The toe-supporter F, having yielding jaws $e$ $e$, as described.

3. The toe-supporter F, provided with the yielding jaws $e$ $e$ and the intertoothed caps $k$ $k$, arranged as set forth.

4. The toe-supporter F, provided with the auxiliary adjustable instep foot-supporter G, arranged with it, as specified.

5. The combination of the jaws K K, slides $n$ $n$, levers L L, arm M, adjustable and yielding screw $s$, all arranged and applied together, substantially in manner and by means and to operate as specified.

6. The combination of the lever N and the adjusting-screw $x$ with the arm M, combined with the jaws K K by means substantially as set forth.

7. The combination of each jaw K or T, the slide $n$ or $n^1$, the lever L or L', the yielding and adjustable screw $o$ or $o^1$, and the arm M or M', adjusting-screw $x$ or $x'$, and lever N or U, all constructed and arranged substantially as represented.

8. The screw-shafts S S, provided, as described, with screws of different pitches, and arranged with the frame A and the carriage R, and provided with operative mechanism, all substantially as set forth.

9. The rods $u'$ $u'$, the swivels $s'$, the screws $r^2$ and $t'$, combined and arranged together, and with the levers U and the cross-bar $v'$, all being essentially as explained and represented.

10. The combination of the toggles $c^2$ $d^2$, the lever $b^4$, the links $d^3$, and the pedal-lever $h^2$, provided with the arm $g^2$.

11. The combination of the foot-rest $l^2$ and the lever-latch $m^2$ with the pedal-lever $h^2$, all arranged and to operate together and with the top of the slot $k^2$, as set forth.

12. The spring or presser $o^2$, arranged and combined with the lateral jaw and its arm M', such being as and for use as specified.

CHARLES H. TRASK.
HENRY F. WHEELER.

Witnesses:
R. H. EDDY,
J. R. SNOW.